United States Patent
Sreedhar et al.

(10) Patent No.: US 11,907,587 B2
(45) Date of Patent: Feb. 20, 2024

(54) MANAGING PERSISTENT MEMORY REGIONS ACROSS MULTIPLE PROTOCOLS

(71) Applicant: Western Digital Technologies, Inc., San Jose, CA (US)

(72) Inventors: Pradeep Sreedhar, Bangalore (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/343,357

(22) Filed: Jun. 9, 2021

(65) Prior Publication Data

US 2022/0398046 A1    Dec. 15, 2022

(51) Int. Cl.
  *G06F 3/06*      (2006.01)
(52) U.S. Cl.
  CPC ............ *G06F 3/0661* (2013.01); *G06F 3/061* (2013.01); *G06F 3/0676* (2013.01); *G06F 3/0677* (2013.01); *G06F 3/0679* (2013.01); *G06F 3/0682* (2013.01)
(58) Field of Classification Search
  CPC ................................ G06F 3/0661; G06F 3/061
  See application file for complete search history.

(56) References Cited

U.S. PATENT DOCUMENTS

| | | | |
|---|---|---|---|
| 10,521,343 B2 | 12/2019 | Helmick et al. | |
| 10,564,872 B2 | 2/2020 | Benisty | |
| 10,846,017 B2 | 11/2020 | Agarwal | |
| 10,949,106 B2 | 3/2021 | Hsieh | |
| 2002/0112075 A1* | 8/2002 | Takashimizu | G06F 11/2025 709/224 |

(Continued)

FOREIGN PATENT DOCUMENTS

KR    10-2018-0012201 A    2/2018

OTHER PUBLICATIONS

"SD Express Cards with PCIe and NVMe Interfaces", SD Association, White Paper, Jun. 2018.

(Continued)

*Primary Examiner* — Nanci N Wong
(74) *Attorney, Agent, or Firm* — Rutan & Tucker LLP; Hani Z. Sayed; Ravi Mohan

(57) ABSTRACT

Storage devices are described herein that are capable of communicating with host-computing devices using multiple protocols. These Multi-Protocol Storage Devices (MPSDs) can be configured to utilize a persistent memory region (PMR) across a variety of protocols. Often, one of these protocols is the Non-Volatile Memory express (NVMe) protocol which provides for the ability to utilize and manage a PMR within the storage device. Other protocols may not have native support for PMR like the NVMe protocol does. Therefore, MPSDs are disclosed that may determine which protocol is in use in response to an initialization event and adjust the use of the PMR as needed based on the determined protocol. These adjustments may allow for the direct access of the PMR as an extension of general memory storage or may be configured to provide increased performance of the storage device overall. These storage devices may be hot-swappable between numerous host-computing systems.

14 Claims, 6 Drawing Sheets

(56) References Cited

U.S. PATENT DOCUMENTS

| | | | |
|---|---|---|---|
| 2004/0193737 A1* | 9/2004 | Huffman | G06F 3/0617 |
| | | | 710/1 |
| 2013/0283079 A1* | 10/2013 | Puthiyedath | G06F 1/3234 |
| | | | 713/323 |
| 2014/0149662 A1* | 5/2014 | Kamalavannan | G06F 3/0632 |
| | | | 711/114 |
| 2015/0380844 A1* | 12/2015 | Lee | H01R 12/7094 |
| | | | 439/70 |
| 2016/0328347 A1* | 11/2016 | Worley | G06F 13/4282 |
| 2018/0165169 A1* | 6/2018 | Camp | G06F 3/064 |
| 2019/0056879 A1* | 2/2019 | Hudson | G11C 7/20 |
| 2019/0069437 A1* | 2/2019 | Adrian | H05K 7/1487 |
| 2019/0087362 A1 | 3/2019 | Satish et al. | |
| 2020/0004445 A1 | 1/2020 | Benisty | |
| 2020/0057578 A1* | 2/2020 | Benisty | G06F 3/064 |
| 2020/0142842 A1* | 5/2020 | Ryu | G06F 13/1668 |
| 2020/0143118 A1* | 5/2020 | Inagaki | G06F 3/00 |
| 2020/0174687 A1* | 6/2020 | Lee | G06F 3/061 |
| 2020/0242068 A1* | 7/2020 | Lin | G06F 13/4221 |
| 2020/0242069 A1* | 7/2020 | Lin | G06F 13/4282 |
| 2021/0064551 A1* | 3/2021 | Shiau | G06F 13/4221 |
| 2021/0157720 A1 | 5/2021 | Bert | |
| 2021/0352132 A1* | 11/2021 | Nix | H04L 9/3247 |
| 2022/0027233 A1* | 1/2022 | Klein | G06F 3/0688 |

OTHER PUBLICATIONS nvmEXPRESS, "Base Specification", Revision 2.0, Jul. 23, 2021.
International Search Report and Written Opinion, PCT Application No. PCT/US2022/017962, dated Jun. 30, 2022.

* cited by examiner

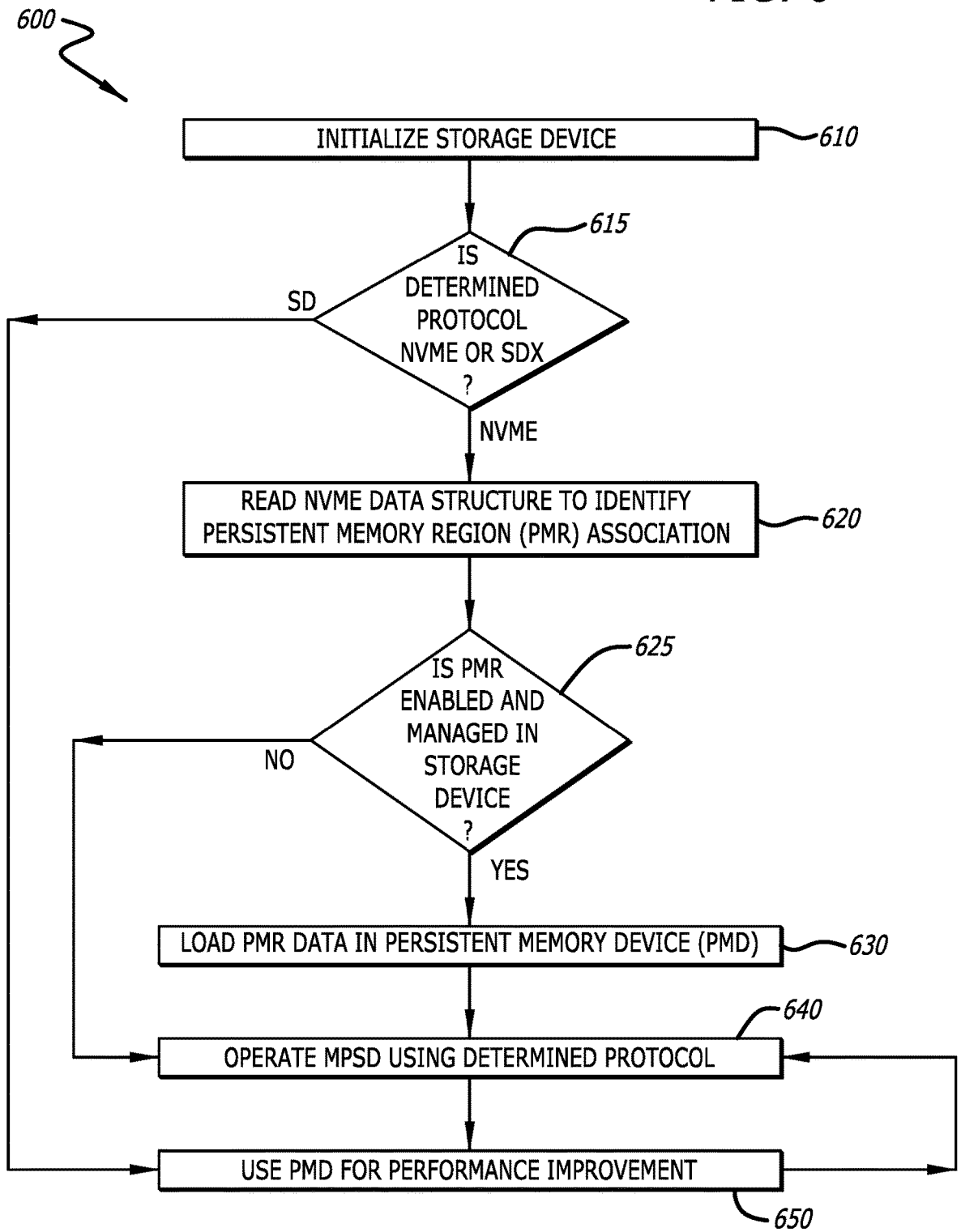

MANAGING PERSISTENT MEMORY REGIONS ACROSS MULTIPLE PROTOCOLS

FIELD

The present disclosure relates to storage devices. More particularly, the present disclosure relates to utilizing persistent memory regions within storage devices across multiple protocols and/or multiple hosts.

BACKGROUND

Storage devices are ubiquitous within computing systems. Recently, solid-state storage devices have become increasingly common. These nonvolatile storage devices can communicate utilizing various protocols including non-volatile memory express (NVMe), peripheral component interconnect express (PCIe), serial attached SCSI (SAS), serial AT attachment (SATA), secure digital (SD), SD Express (SDX), MultiMediaCard (MMC), and embedded MMC (eMMC) to reduce processing overhead and increase efficiency.

Like many areas of technology, the market for solid-state storage devices is driven by entities that desire products that are faster, cheaper, have greater storage capacity, and/or are easier to use. Increasingly, customers use multiple computing systems employing storage devices using a plurality of communications protocols. For example, large businesses often have disk arrays attached to their servers. These arrays often contain multiple storage devices of different technologies (e.g., solid-state, rotating disk, etc.) and different protocols (e.g., SAS, SCSI, PCIe, NVMe, etc.).

In another example, many individuals have multiple personal computing devices (e.g., cellphones, laptops, desktop computers, tablets, video cameras, gaming consoles, etc.) employing different protocols (e.g., PCIe, NVMe, SD, SDX, MMC, eMMC, etc.). It is highly desirable to be able to easily transfer large amounts of data between these devices. Since there are many consumer storage devices on the market using these different protocols, it may be difficult to transfer data between two computing devices that do not share a common protocol.

PCIe is an older protocol that was originally optimized for use with rotating disk storage devices. While high performance, PCIe is not optimal for use with solid-state storage devices which, for example, typically have substantially shorter read and write access times. The NVMe protocol uses the same physical interface as PCIe but is optimized to maximize performance of solid-state storage devices.

In addition to the communications aspects of NVMe, the protocol allows access to various device features and resources. An example of such a feature is the ability to use a persistent memory region (PMR). Such a region is a portion of the storage device's internal memory that maintains its data (e.g., is persistent) between power cycles and/or device initializations. As such, the PMR resources are typically not available or accessible by another protocol in a multi-protocol storage device.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 6 is a flowchart depicting a process for operating a multi-protocol storage device according to an embodiment of the disclosure.

Figure 1:
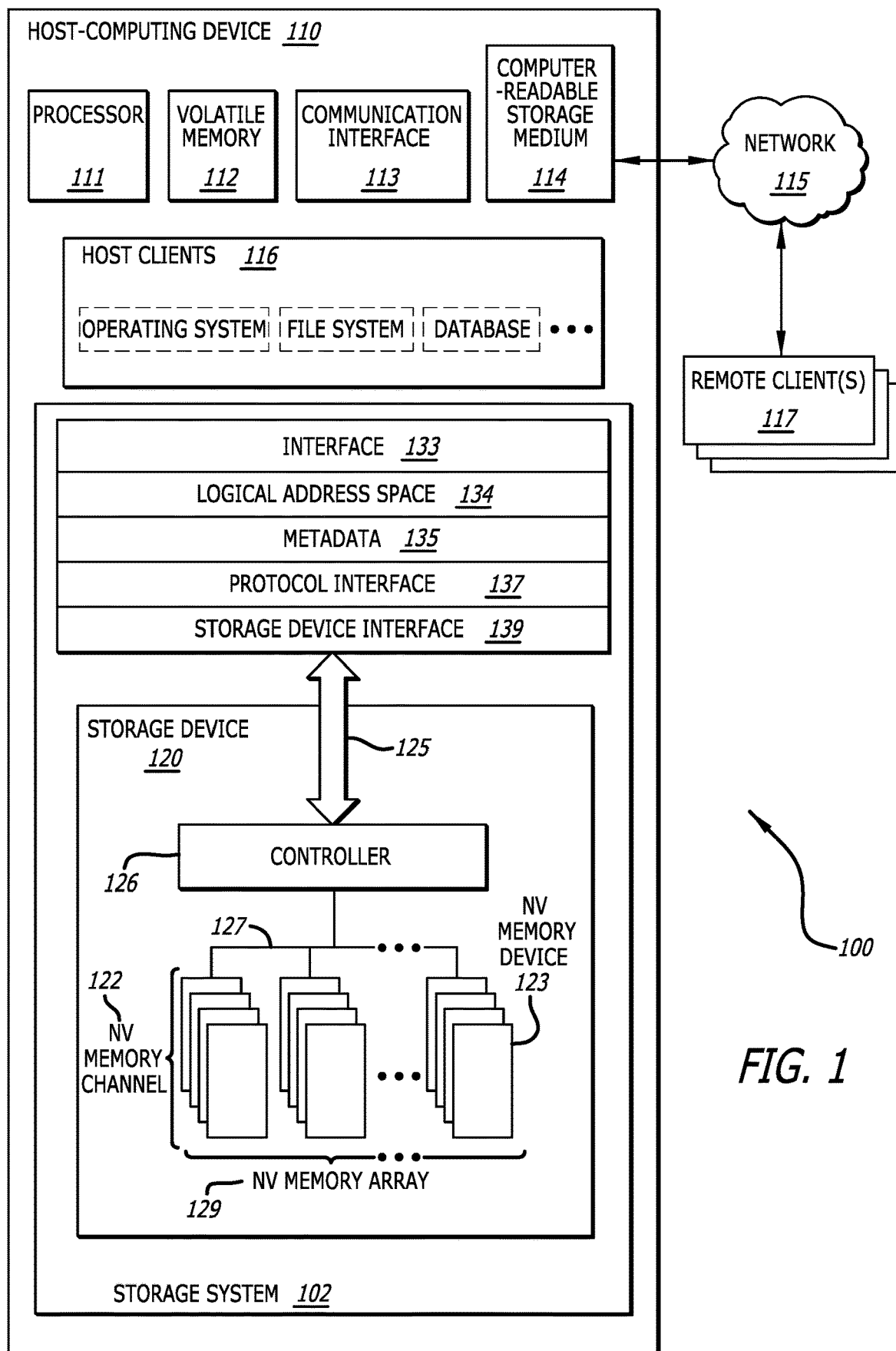
FIG. 1 is a schematic block diagram of a host-computing device with a storage device suitable for managing persistent memory regions across multiple protocols in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems and scenarios described above, devices and methods are discussed herein for storage devices suitable for managing persistent memory regions (PMR) across multiple protocols. PMR is a resource defined by the non-volatile memory express (NVMe) communications protocol. In many embodiments, the PMR provides device memory resources that retain their data (the data is said to persist in the memory resource) between power cycles and initializations. PMR is an optional area of persistent memory that is located on the NVMe device, and can be read with standard PCIe memory reads/writes. In many embodiments, this could be extra DRAM that is power protected, storage class memory or other new memory types.

In some embodiments, the PMR may be implemented in volatile memory like, for example, dynamic random access memory (DRAM), static random access memory (SRAM), quadruple data rate SRAM (QDR SRAM), etc. In such cases, the contents of the PMR memory may be preserved in some manner like, for example, providing battery backup to the volatile memory, transferring the data to non-volatile memory (NVM), etc., before powering down or reinitializing the device. In some embodiments the PMR may be implemented in non-volatile memory.

In various embodiments, storage devices, such as NVMe Multi-Protocol Storage Devices (MPSDs) may utilize the NVMe protocol at some times, and at other times utilize a second communications protocol (e.g., peripheral component interconnect express (PCIe), serial attached SCSI (SAS), serial AT attachment (SATA), secure digital (SD), SD Express (SDX), MultiMediaCard (MMC), and embedded MMC (eMMC), etc.). When the second protocol is in use, the PMR may be unavailable or invisible and the device resources used to implement the PMR may be underutilized. Aspects of the various embodiments of the present disclosure address these issues.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device with a storage device suitable for managing persistent memory regions over multiple protocols in accordance with an embodiment of the disclosure is shown. The PMR management system 100 comprises one or more storage devices 120 of a storage system 102 within a host-computing device 110 in communication via a controller 126. In many embodiments, the storage device 120 can be a MPSD. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more dual inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in some embodiments, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. The device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. If storage device 120 is a multi-protocol device, a protocol interface 137 may be used to select the correct or desired protocol. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (SATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, may comprise storage class memory (SCM) (e.g., write in place memory, or the like).

The non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
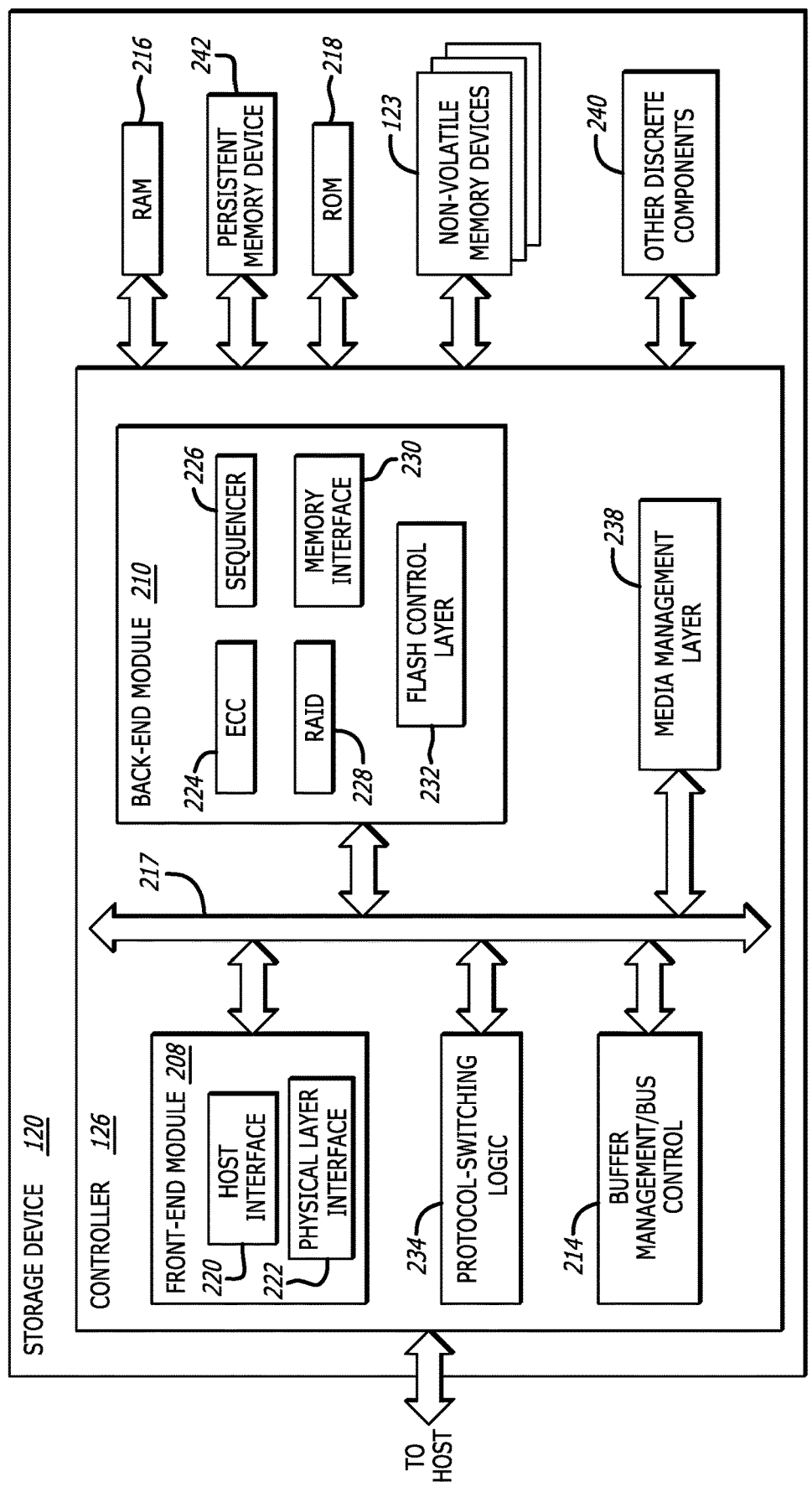
FIG. 2 is a schematic block diagram of a storage device suitable for managing persistent memory regions across multiple protocols in accordance with an embodiment of the disclosure.

Referring to FIG. 2, a schematic block diagram of a storage device suitable managing persistent memory regions across multiple protocols in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. Persistent memory device (PMD) 242 may also be present in storage device 120 and may be managed by buffer management/bus control module 214. In some embodiments, the persistent memory region (PMR) may be stored in persistent memory device 242, while in other embodiments, the PMR may be stored in RAM 216, non-volatile memory devices 123, or elsewhere in controller 126 or storage device 120.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction code (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a protocol-switching logic 234. This logic may be responsible for determining the protocol selected for communication with the host-computing device 110. In some embodiments, the protocol-switching logic 234 may be operated whenever the storage device 120 is initialized either while power is maintained or while power cycled (e.g., when powered up initially or when powered down and then powered up). Protocol-switching logic 234 may also determine in certain embodiments how the PMR and persistent memory device 242 are handled.

The bulk of the data retained in MPSD may be stored within NVM devices 123. As discussed above, this memory may be partitioned into logical blocks and may be identified by logical block addresses (LBA). For each logical block, there may be a physical block in the NVM devices 123 that may have a physical address known to the controller 126. The host-computing device 110 may access the data using the LBA, and the controller may translate between the LBAs and the physical addresses in a manner transparent to host-computing device 110. When the PMR and PMD 242 are used, they are accessed as additional LBAs as if the storage capacity was larger by that number of LBAs.

Figure 3:
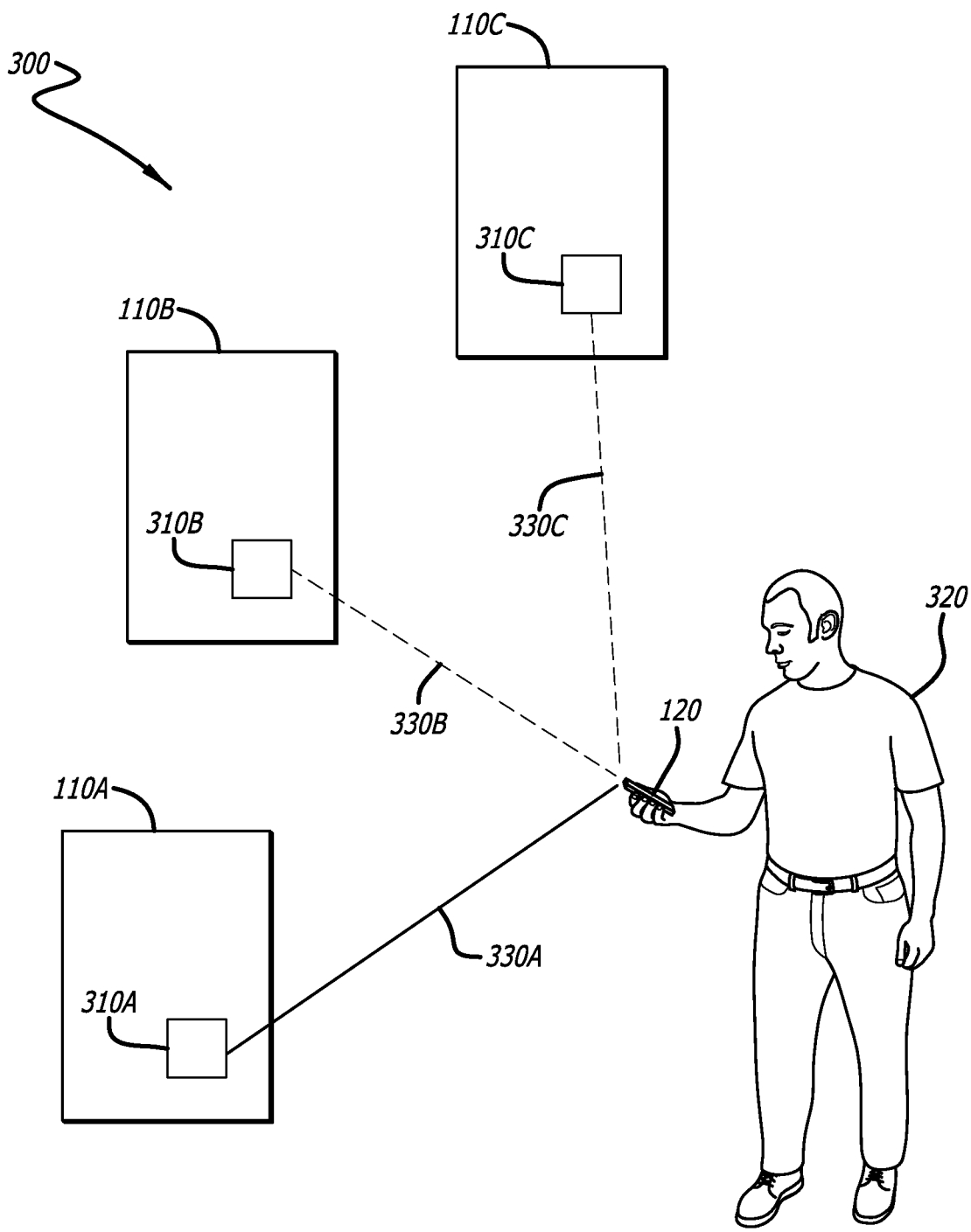
FIG. 3 is a conceptual diagram of using a storage device suitable for managing persistent memory regions across multiple protocols with multiple host-computing systems in accordance with an embodiment of the disclosure.

Referring to FIG. 3, a conceptual diagram 300 of using a storage device 120 suitable for managing persistent memory regions across multiple protocols with multiple host-computing systems in accordance with an embodiment of the disclosure is shown. The embodiment depicted in FIG. 3 shows a storage device 120 (also described as an MPSD) is shown along with three instances of host-computing devices 110A, 110B, and 110C. Each host-computing device 110A, 110B, 110C may further comprise a physical interface 310A, 310B, 310C compatible with the MPSD 120. When an MPSD 120 is coupled to a first physical interface 310A, the MPSD 120 can function and communicate with the associated first host-computing device 110A. The actual construction of the physical interfaces 310 can vary depending upon the physical and/or electrical construction (i.e. form factor) of the MPSD 120.

In the embodiment depicted in FIG. 3, a user 320 is shown holding a portable version of an MPSD 120. The user 320 has a choice of inserting the MPSD 120 into a physical interface 310A, 310B, 310C of any of the three host-computing devices 110A, 110B, 110C. The first host-computing device 110A may operate with a first protocol, while the second and third host-computing devices 110B, 110C may operate under a second and third protocol. The solid line 330A indicates user 320 has chosen physical interface 310A in host-computing device 110A, while dashed lines 330B and 330C indicate that host-computing devices 110B and 110C respectively were options not chosen or may be chosen at a later time.

For example, when coupled to the first host-computing device 110A, the MPSD 120 may operate under the first protocol, but then moved to a second host-computing device 110B by inserting the MPSD 120 into the second physical interface 310B, the MPSD 120 may operate under the second protocol. In this way, the MPSD 120 may change protocols and thus alter operation of the PMR based on the selected protocol. The specific changes in handling of the PMR are outlined in various embodiments described below.

Persons skilled in the art will appreciate that host-computing devices 110A, 110B, and 110C may, but need not, be identical and that many different host-computing devices 110 could be utilized. In some embodiments, the first host-computing device 110A may be a cellphone, the second host-computing device 110B may be a laptop computer, and the third host-computing device 110C may be a gaming console, etc., though there are many more combination and/or possibilities. For example, in other embodiments, the first host device 110A may be a disk array, the second host-computing device 110B may be a network-access storage (NAS) device, and the third host-computing device 110C may be a rack-mounted server, etc., though again there are many more possibilities. Such skilled persons will also appreciate that many different physical interfaces such as physical interfaces 310A, 310B, 310C are possible as determined by the form factor of the MPSD 120. For example, the physical interface in a cellphone may be different from one in a game console, desktop computer or a disk array, etc., but all will have the necessary physical and electrical features needed to successfully couple an MPSD 120 to its associated host-computing device.

Figure 4:
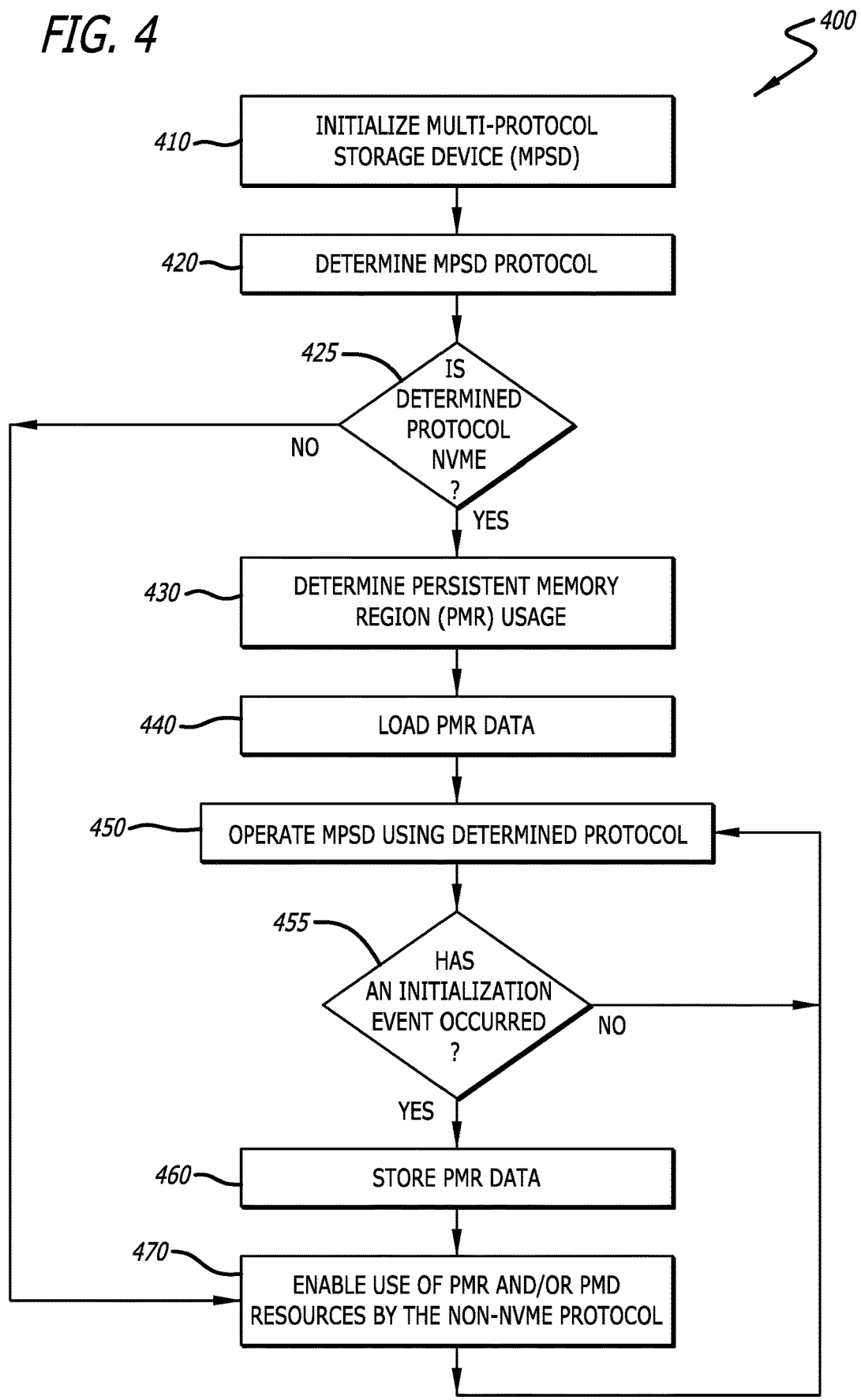
FIG. 4 is a flowchart depicting a process for operating a multi-protocol storage device according to an embodiment of the disclosure.

Referring to FIG. 4, a flowchart depicting a process 400 for operating a multi-protocol storage device (MPSD) in accordance with an embodiment of the disclosure is shown. The MPSD may already be coupled to a host-computing device and powered up. In many embodiments, the process 400 may begin by initializing the MPSD (block 410). An initialization process may occur to prepare the MPSD for operation. This may involve tasks like verifying that one or more power supplies is at or above an acceptable voltage level, verifying the connectivity between the host-computing device and the MPSD, querying host-computing device or the controller internal to the MPSD for operating parameters or data, storing parameters and/or operating data into control registers or memory to enable and/or control features such as communications protocols, modes of operation, and the like.

Upon or during initialization, the process 400 may determine the communications protocol to be used by the MPSD (block 420). This may be determined in different embodiments based upon, for example, detection of a power supply being turned on, a software or hardware command, data stored in volatile or non-volatile memory, in volatile or non-volatile registers or control bits, etc. Once the protocol has been determined, upon or during initialization, process 400 can configure the MPSD to operate properly based upon the determined protocol (block 425).

In a number of embodiments, the determined protocol can be NVMe or a second protocol like, for example, SAS, SATA, PCIe, SD, MMC, eMMC, etc. The NVMe protocol may allow for an optional persistent memory region (PMR) which may be stored and utilized in a persistent memory device (PMD) which, if present, would ordinarily be invisible to (and thus unusable by) the host-computing device when operating the MPSD under a second protocol. In some embodiments, the PMR may be implemented using, for example, additional dynamic random access memory (DRAM) and/or additional static random access memory (SRAM) that is/are power and/or battery protected, storage class memory such as a non-volatile dual inline memory module (NV-DIMM) or the like, and/or some other memory type, etc.

If the determined protocol is NVMe, then upon or during initialization, process 400 may determine the PMR usage (block 430). The NVMe data structure may be read to determine that the PMR is to be enabled and the values of its various parameters like its size and/or its physical and/or logical addresses, etc. If enabled, then the process 400 may load the most recently stored PMR data into memory at the correct locations (block 440). In various embodiments, this may involve transferring the data from a non-volatile storage location like, for example, a non-volatile memory device or array, to a designated persistent memory device (PMD). The type of memory employed for the PMD can vary from one embodiment to another and may be either volatile or non-volatile and can be present in many different locations internal to the MPSD. Persons skilled in the art will appreciate that if the PMR feature is not enabled or if the data is already present in the PMD, then the loading operation may be unnecessary and may be skipped by process 400. Upon the completion of initialization, process 400 may begin operation of the MPSD using the determined (NVMe) protocol (block 450).

If the determined protocol is not NVMe, then process 400 may configure the PMR and/or PMD resources internal to the MPSD to be visible to the second (Non-NVMe) protocol (block 470). In some embodiments, the PMR may appear to the host-computing device as additional logical block addresses (LBAs) that are available for use as an extension of non-volatile memory array. These additional (or extended) LBAs may be used for storing internal data structures, caching logical-to-physical address tables, TRAM, garbage collection, enhanced post write read, wear leveling, executable code, and the like. Upon the completion of initialization, process 400 may begin operation of the MPSD using the second protocol (block 450).

During operation, the process 400 may receive an initialization event and/or periodically check to see if an initialization event has occurred (block 455). If no initialization event has occurred, the MPSD may continue operating using the selected protocol (block 450). An initialization event may be a power outage, a brownout (e.g., a partial loss of a power supply voltage), a reinitialization or power down command from the host-computing device (or some other source), a real-time interrupt handler (e.g., a software or firmware routine which may respond to an alert) from a processor, or the like. If such an initialization event has occurred and the determined protocol is NVMe, then the process 400 may store the PMR data (block 460) before proceeding to again initializing the MPSD (block 410). If such an initialization event has occurred and the determined protocol is not NVMe, then the process 400 may proceed to again initializing the MPSD (block 410).

Figure 5:
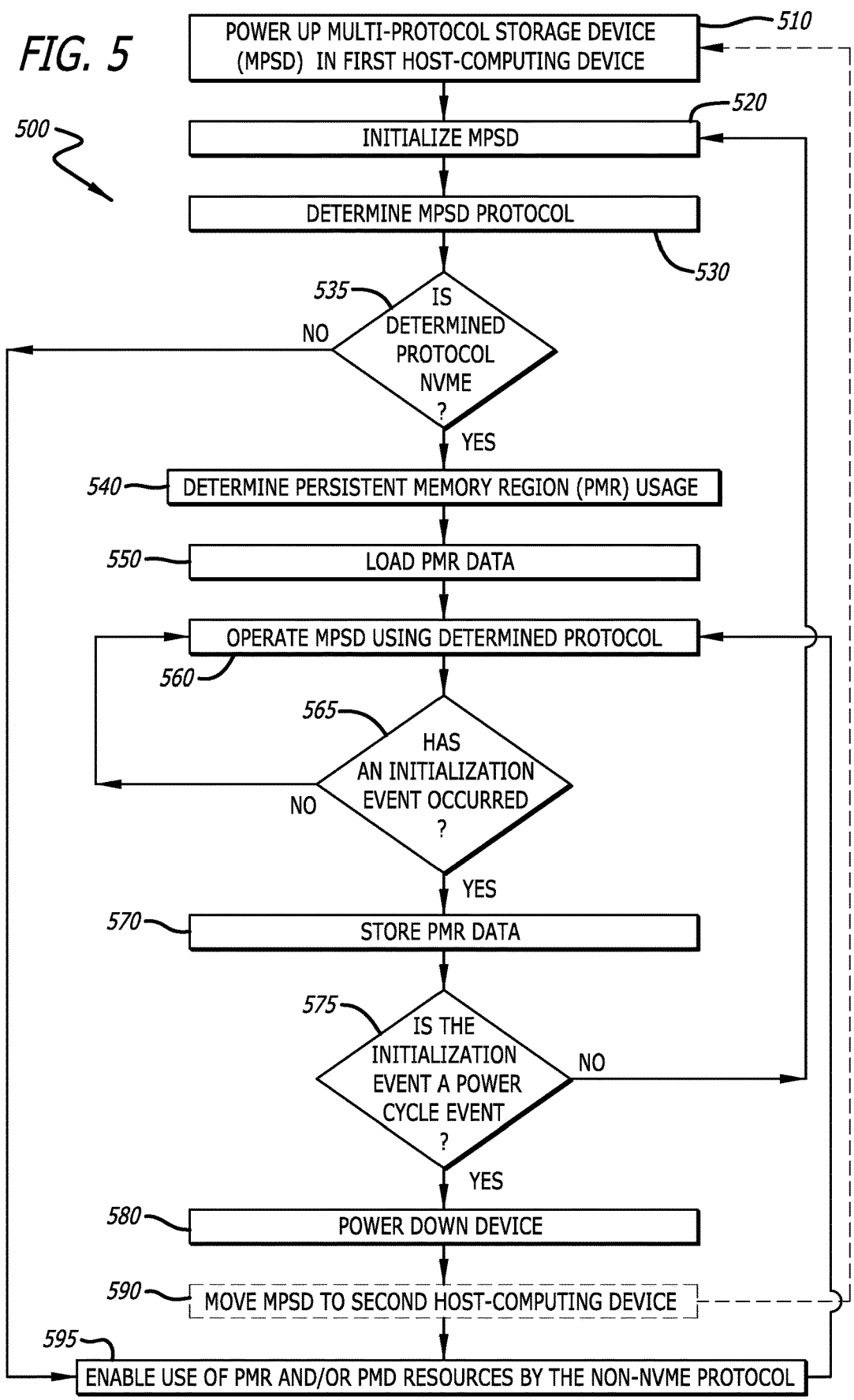
FIG. 5 is a flowchart depicting a process for operating a multi-protocol storage device according to an embodiment of the disclosure.

Referring to FIG. 5, a flowchart depicting a process 500 for operating a multi-protocol storage device (MPSD) in accordance with an embodiment of the disclosure is shown. The MPSD may already be coupled to a host-computing device. The process 500 may begin by applying power to the MPSD (block 510). In response, an initialization process may occur to prepare the MPSD for operation (block 520). This process may involve tasks like verifying that one or more power supplies is at or above an acceptable voltage level, verifying the connectivity between the host-computing device and the MPSD, querying host-computing device or the controller internal to the MPSD for operating parameters or data, storing parameters and/or operating data into control registers or memory to enable and/or control features such as communications protocols, modes of operation, etc.

In response to or during initialization, the process 500 may determine the communications protocol to be used by the MPSD (block 530). This may be determined in different embodiments based upon, for example, detection of a power supply being turned on, a software or hardware command, data stored in volatile or non-volatile memory, in volatile or non-volatile registers and/or control bits, etc. The process 500 can determine if the protocol is NVMe or not (block 535). Once the protocol has been determined, upon or during the initialization, the process 500 can further configure the MPSD to operate properly based upon the determined protocol.

Typically, the determined protocol may be NVMe or a second protocol like, for example, SAS, SATA, PCIe, SD, SDX, MMC, eMMC, etc. The NVMe protocol may allow for an optional persistent memory region (PMR) which may be stored and utilized in a persistent memory device (PMD) which, if present, would ordinarily be invisible to (and thus unusable by) the host-computing device when operating the MPSD under a second protocol. In some embodiments, the PMR may be implemented using, for example, additional dynamic random access memory (DRAM) and/or additional static random access memory (SRAM) that is/are power and/or battery protected, storage class memory such as a non-volatile dual inline memory module (NV-DIMM) or the like, and/or some other memory type, etc.

If the determined protocol is NVMe, then upon or during initialization, process 500 may determine the PMR usage (block 540). The NVMe data structure may be read to determine that the PMR is to be enabled and the values of its various parameters like its size and/or its physical and/or logical addresses, etc. If enabled, then the process 500 may load the most recently stored PMR data into memory at the correct locations (block 550). In some embodiments, this may involve transferring the data from a non-volatile storage location like, for example, a non-volatile memory device or array, to a designated PMD. As discussed above with reference to the embodiments described in FIG. 4, the type of memory employed for the PMD can vary from one embodiment to another and may be either volatile or non-volatile and can be present in many different locations internal to the MPSD. Persons skilled in the art will appreciate that if the PMR feature is not enabled or if the data is already present in the PMD, then the loading operation may be unnecessary and may be skipped by process 500. Upon the completion of initialization, the process 500 may begin operation of the MPSD using the determined (NVMe) protocol (block 560).

Again, if the determined protocol is not NVMe, then process 500 may configure the PMR and/or PMD resources internal to the MPSD to be visible to the second (Non-NVMe) protocol (block 595). In some embodiments, the PMR may appear to the host-computing device as additional LBAs that are available for use as an extension of non-volatile memory array. These additional (or extended) LBAs may be used for storing internal data structures, caching logical-to-physical address tables, TRAM, garbage collection, enhanced post write read, wear leveling, executable code, and the like. Upon the completion of initialization, process 500 may begin operation of the MPSD using the second protocol (block 560).

During operation, the process 500 may receive an initialization event and/or periodically check to see if an initialization event has occurred (block 565). If no initialization event has occurred, the MPSD may continue operating using the selected protocol (block 560). In a. number of embodiments, an initialization event may be caused by or triggered from a power outage, a brownout (e.g., a partial loss of a power supply voltage), a reinitialization or power down command from the host-computing device (or some other source), a real-time interrupt handler (e.g., a software or firmware routine which may respond to an alert) from a processor, or the like.

In many embodiments, if such an initialization event has occurred and the determined protocol is NVMe, then the process 500 may store the PMR data (block 570) and may determine if the initialization event is a power cycle event (powering down and/or then powering up the device) or not (block 575). If such an initialization event has occurred and the determined protocol is not NVMe, then there may be no need to store PMR data the process 500 can determine if the initialization event is a power cycle event or not (block 575). If the initialization event is not a power cycle event, then process 500 may proceed to again initialize the MPSD (block 520). However, if the initialization event is indeed a power cycle event, then process 500 may proceed to power down the MPSD (block 580).

When the MPSD is powered down, it may optionally be decoupled and removed from the first host-computing device and moved and/or coupled to a second host-computing device (block 590). The process 500 may then proceed to again power up the MPSD (block 510) as before. However, if the MPSD is not removed from the first host-computing device, then the process 500 may still proceed to power up the MPSD (block 510) again.

Referring to FIG. 6, a flowchart depicting a process 600 for operating a multi-protocol storage device (MPSD) in accordance with an embodiment of the disclosure is shown. In many embodiments, the process 600 may begin by initializing the MPSD (block 610). As described in more detail above, an initialization process may occur to prepare the MPSD for operation. This may involve tasks like verifying that one or more power supplies is at or above an acceptable voltage level, verifying the connectivity between the host-computing device and the MPSD, querying the host-computing device or the controller internal to the MPSD for operating parameters or data, storing parameters and/or operating data into control registers or memory to enable and/or control features such as communications protocols, modes of operation, and the like.

In various embodiments, in response to or during initialization, the process 600 may determine the communications protocol to be used by the MPSD. This may be determined in different embodiments based upon, for example, detection of a power supply being turned on, a software or hardware command, data stored in volatile or non-volatile memory, in volatile or non-volatile registers or control bits, etc. In some embodiments, the determined protocols may be chosen between the NVMe protocol and the SDX protocol (block 615). In numerous embodiments, the determination of which protocol is being used can be done by analyzing the data being received on one or more of the data communication channels (e.g., data pins). By analyzing the data being sent from the host-computing device upon coupling, the protocol being sought can be determined and thus configured for the MPSD. Once a protocol has been determined, the process 600 can configure the MPSD to operate properly based upon the determined protocol. As described above, the NVMe protocol may allow for an optional PMR that may be configured to be stored and utilized in a PMD which, if present, would ordinarily be invisible to (and thus unusable by) the host-computing device when operating the MPSD under the SDX protocol.

If the determined protocol is NVMe, the process 600 may further determine the PMR usage and association such as if the PMR is to be enabled and/or what the values of its various parameters may be such as, but not limited to, size and/or physical and/or logical addresses, etc. (block 620). In many embodiments, the process 600 may further determine if the PMR is enabled and managed within the storage device (block 625). If enabled, then various embodiments of the process 600 may load the most recently stored PMR data into memory at the correct locations (block 630). In further embodiments, this may involve transferring the data from a non-volatile storage location like, for example, a non-volatile memory device or array, to a designated PMD. In various embodiments, the type of memory employed for the PMD can vary such as being either volatile or non-volatile and/or located in different physical areas of the MPSD. Persons skilled in the art will appreciate that if the PMR feature is not enabled or if the data is already present in the PMD, then the loading operation may be unnecessary and may be skipped by process 600. Upon the completion of initialization, process 600 may begin operation of the MPSD using the NVMe protocol (block 640).

If the determined protocol is SDX or other similar variants, then process 600 may configure the PMR and/or PMD resources of the MPSD to be visible to the second protocol and available for improving the performance of the MPSD (block 650). In some embodiments, the PMR may appear to the host-computing device as additional LBAs that are available for use as an extension of non-volatile memory array. These additional (or extended) LBAs may be used for storing internal data structures, caching logical-to-physical address tables, TRAM, garbage collection, enhanced post write read, wear leveling, executable code, and the like. Upon completion of the initialization, process 400 may begin operation of the MPSD using the SDX protocol (block 640).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method of managing a persistent memory region (PMR) within a device, comprising:
    configuring operation under a plurality of protocols through a single interface, wherein at least one of the plurality of protocols is a Non-Volatile Memory Express (NVMe) protocol;
    initializing the device;
    determining a protocol for operation:
        wherein if the determined protocol is an NVMe protocol:
            a PMR usage threshold is determined;
            data associated with the PMR is loaded; and
            the device is operated under the determined NVMe protocol; and
        wherein if the determined protocol is a second protocol, the device is operated under the determined second protocol;
    physically decoupling the device from a first host-computing device;
    physically coupling the device to a second host-computing device operating under a second protocol; and
    determining the second protocol.

2. The method of claim 1, wherein the device is configured as a Secure Digital Express (SDX) device.

3. The method of claim 1, wherein the device is coupled to a first host-computing device operating under a first protocol.

4. The method of claim 1, wherein the determination of the second protocol is triggered by an initialization event.

5. The method of claim 4, wherein the initialization event occurs in response to the coupling of the device to the second host-computing device.

6. The method of claim 4, wherein the first and second host-computing devices provide power to the device.

7. The method of claim 6, wherein the initialization event occurs in response to a restoration of power upon coupling the device to the second host-computing device.

8. A device, comprising:
    a processor;
    a memory comprising a Persistent Memory Region (PMR) configured to operate under multiple protocols through a single interface wherein a first protocol is a Non-Volatile Memory Express (NVMe) protocol;
    a Non-Volatile Memory (NVM) array organized into logical blocks; and
    a persistent memory device (PMD) organized into logical blocks:
        wherein PMR data is loaded into the PMD from the NVM array under the NVMe protocol;
        wherein the PMD comprises extended logical blocks to the NVM array under a second protocol; and
        a protocol-switching logic configured to direct the processor to:

determine a protocol for use within the device;
wherein if the determined protocol is an NVMe protocol:
PMR usage is determined;
data associated with the PMR is loaded; and
the device is operated under the determined NVMe protocol;
wherein if the determined protocol is a second protocol, the device is operated under the determined second protocol; and
wherein the protocol-switching logic is further configured to initialize the device after determining a protocol.

9. The device of claim 8, wherein the second protocol is selected from the group consisting of: Peripheral Component Interconnect Express (PCIe), Serial Attached SCSI (SAS), Serial AT Attachment (SATA), Secure Digital (SD), Secure Digital Express (SDX), MultiMediaCard (MMC), and extended MMC (eMMC).

10. The device of claim 8, wherein the protocol-switching logic is further configured to:
receive an initialization event;
store the PMR data into the NVM array; and
initialize the device.

11. The device of claim 8, wherein the protocol-switching logic is further configured to:
receive a power cycle event;
store the PMR data into the NVM array; and
power down the device.

12. A device, comprising:
a processor;
a memory comprising a Persistent Memory Region (PMR) configured to operate under multiple protocols through a single interface wherein a first protocol is a Non-Volatile Memory Express (NVMe) protocol and a second protocol is a Secure Digital Express (SDX) protocol; and
a protocol-switching logic configured to direct the processor to:
initialize the device; and
determine a protocol for use with the device:
wherein if the determined protocol is an NVMe protocol:
a PMR usage threshold is determined;
data associated with the PMR is loaded; and
the device is operated under the determined NVMe protocol;
wherein if the determined protocol is an SDX protocol, the PMR is operated under the SDX protocol;
wherein the PMR is configured to provide performance enhancements under the SDX protocol;
wherein the device is configured to physically couple with multiple host-computing devices; and
wherein the device is further configured to be hot-swappable between multiple host-computing devices.

13. The device of claim 12, wherein the determination of a protocol occurs in response to coupling the device to a new host-computing device.

14. The device of claim 13, wherein the determination of the protocol can occur by analyzing data transferred on one or more data channels.

* * * * *